(12) United States Patent
Keith, Jr.

(10) Patent No.: US 9,448,858 B2
(45) Date of Patent: *Sep. 20, 2016

(54) ENVIRONMENT MANAGER

(71) Applicant: Microsoft Technology Licensing, LLC, Redmond, WA (US)

(72) Inventor: Robert O. Keith, Jr., Modesto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 382 days.

This patent is subject to a terminal disclaimer.

(21) Appl. No.: 14/139,398

(22) Filed: Dec. 23, 2013

(65) Prior Publication Data

US 2014/0109109 A1   Apr. 17, 2014

Related U.S. Application Data

(63) Continuation of application No. 11/977,890, filed on Oct. 26, 2007, now Pat. No. 8,645,515.

(51) Int. Cl.
*G06F 15/173* (2006.01)
*G06F 9/54* (2006.01)
*G06F 11/30* (2006.01)
*G06F 11/34* (2006.01)

(52) U.S. Cl.
CPC ............. *G06F 9/54* (2013.01); *G06F 11/3058* (2013.01); *G06F 11/3409* (2013.01)

(58) Field of Classification Search
CPC ....................................................... G06F 9/54
USPC ....................................................... 709/223
See application file for complete search history.

(56) References Cited

U.S. PATENT DOCUMENTS

| 4,866,635 | A | 9/1989 | Kahn et al. |
| 5,204,897 | A | 4/1993 | Wyman |
| 5,602,990 | A | 2/1997 | Leete |
| 5,649,196 | A | 7/1997 | Woodhill et al. |
| 5,659,743 | A | 8/1997 | Adams et al. |

(Continued)

FOREIGN PATENT DOCUMENTS

| WO | WO2005119493 A2 | 12/2005 |
| WO | WO2005119494 A2 | 12/2005 |

(Continued)

OTHER PUBLICATIONS

IBM Corporation, AFS:"User Guide", First Edition, Version 3.6. Apr. 2000, pp. 112.

(Continued)

*Primary Examiner* — Joon H Hwang
*Assistant Examiner* — Sherman Lin
(74) *Attorney, Agent, or Firm* — Thomas Wong; Doug Barker; Micky Minhas

(57) ABSTRACT

An environment manager includes a set of consolidated and integrated utilities which allow an administrator direct, remote access to information technology resources. The environment manager allows the administrator to control many aspects of the information technology environment including backup and archival of data systems, monitoring of systems, opening and closing of information technology systems, server fail-overs and virtual server environments, managing expert application, desktop management and security and system security.

28 Claims, 4 Drawing Sheets

(56) References Cited

U.S. PATENT DOCUMENTS

| | | |
|---|---|---|
| 5,787,409 A | 7/1998 | Seiffert et al. |
| 5,802,364 A | 9/1998 | Senator et al. |
| 5,812,751 A | 9/1998 | Ekrot et al. |
| 5,835,911 A | 11/1998 | Nakagawa et al. |
| 5,872,931 A * | 2/1999 | Chivaluri ............ H04L 12/2602 |
| | | 709/202 |
| 5,897,635 A | 4/1999 | Torres et al. |
| 5,930,357 A | 7/1999 | Fukui |
| 5,933,647 A | 8/1999 | Aronberg et al. |
| 5,950,010 A | 9/1999 | Hesse et al. |
| 5,974,547 A | 10/1999 | Kilemenko |
| 6,012,152 A | 1/2000 | Douik et al. |
| 6,029,196 A | 2/2000 | Lenz |
| 6,067,582 A | 5/2000 | Smith et al. |
| 6,144,959 A | 11/2000 | Anderson et al. |
| 6,170,065 B1 | 1/2001 | Kobata et al. |
| 6,189,101 B1 | 2/2001 | Dusenbur, Jr. |
| 6,209,089 B1 | 3/2001 | Selitrennikoff et al. |
| 6,212,660 B1 | 4/2001 | Joeressen et al. |
| 6,282,711 B1 | 8/2001 | Halpern et al. |
| 6,292,827 B1 | 9/2001 | Raz et al. |
| 6,301,612 B1 | 10/2001 | Selitrennikoff et al. |
| 6,311,221 B1 | 10/2001 | Raz et al. |
| 6,314,428 B1 | 11/2001 | Brew et al. |
| 6,317,761 B1 | 11/2001 | Landsman et al. |
| 6,339,826 B2 | 1/2002 | Hayes, Jr. et al. |
| 6,349,137 B1 | 2/2002 | Hunt et al. |
| 6,356,915 B1 | 3/2002 | Chtchetkine et al. |
| 6,363,400 B1 | 3/2002 | Chtchetkine et al. |
| 6,366,296 B1 | 4/2002 | Boreczky et al. |
| 6,378,035 B1 | 4/2002 | Parry et al. |
| 6,421,777 B1 | 7/2002 | Pierre-Louis et al. |
| 6,449,658 B1 | 9/2002 | Lafe et al. |
| 6,459,499 B1 | 10/2002 | Tomat |
| 6,463,530 B1 | 10/2002 | Sposato |
| 6,473,794 B1 | 10/2002 | Guheen et al. |
| 6,477,531 B1 | 11/2002 | Sullivan et al. |
| 6,490,677 B1 | 12/2002 | Aguilar et al. |
| 6,536,037 B1 | 3/2003 | Guheen et al. |
| 6,553,375 B1 | 4/2003 | Huang et al. |
| 6,556,950 B1 | 4/2003 | Schwenke et al. |
| 6,574,618 B2 | 6/2003 | Eylon et al. |
| 6,578,142 B1 | 6/2003 | Anderson et al. |
| 6,606,744 B1 | 8/2003 | Mikurak |
| 6,625,651 B1 | 9/2003 | Swartz et al. |
| 6,625,754 B1 | 9/2003 | Aguilar et al. |
| 6,633,782 B1 | 10/2003 | Schleiss et al. |
| 6,636,857 B2 | 10/2003 | Thomas et al. |
| 6,654,797 B1 | 11/2003 | Kamper |
| 6,654,801 B2 | 11/2003 | Mann et al. |
| 6,694,375 B1 | 2/2004 | Beddus et al. |
| 6,697,852 B1 | 2/2004 | Ryu |
| 6,704,886 B1 | 3/2004 | Gill et al. |
| 6,718,464 B2 | 4/2004 | Cromer et al. |
| 6,728,530 B1 | 4/2004 | Heinonen et al. |
| 6,735,625 B1 | 5/2004 | Ponna |
| 6,751,658 B1 | 6/2004 | Haun et al. |
| 6,757,729 B1 | 6/2004 | Devarakonda et al. |
| 6,757,894 B2 | 6/2004 | Eylon et al. |
| 6,795,912 B1 | 9/2004 | Itoh et al. |
| 6,816,462 B1 | 11/2004 | Booth, III et al. |
| 6,816,882 B1 | 11/2004 | Conner et al. |
| 6,820,180 B2 | 11/2004 | McBrearty et al. |
| 6,854,009 B1 | 2/2005 | Hughes |
| 6,871,210 B1 | 3/2005 | Subramanian |
| 6,880,108 B1 | 4/2005 | Gusler et al. |
| 6,885,481 B1 | 4/2005 | Dawe |
| 6,886,020 B1 | 4/2005 | Zahavi |
| 6,898,286 B2 | 5/2005 | Murray |
| 6,915,343 B1 | 7/2005 | Brewer et al. |
| 6,954,853 B2 | 10/2005 | Wang et al. |
| 6,954,930 B2 | 10/2005 | Drake et al. |
| 6,959,235 B1 | 10/2005 | Abdel-Malek et al. |
| 6,985,967 B1 | 1/2006 | Hipp |
| 7,003,560 B1 | 2/2006 | Mullen et al. |
| 7,003,663 B2 | 2/2006 | Lagosanto et al. |
| 7,024,471 B2 | 4/2006 | George et al. |
| 7,058,698 B2 | 6/2006 | Chatterjee et al. |
| 7,080,118 B2 | 7/2006 | Hildebrand |
| 7,143,307 B1 | 11/2006 | Witte et al. |
| 7,149,698 B2 | 12/2006 | Guheen et al. |
| 7,165,087 B2 | 1/2007 | Graupner et al. |
| 7,175,078 B2 | 2/2007 | Ban et al. |
| 7,178,166 B1 | 2/2007 | Taylor et al. |
| 7,194,445 B2 | 3/2007 | Chan et al. |
| 7,200,779 B1 | 4/2007 | Cross, Jr. et al. |
| 7,210,143 B2 | 4/2007 | Or et al. |
| 7,237,122 B2 | 6/2007 | Kadam et al. |
| 7,260,597 B1 | 8/2007 | Hofrichter et al. |
| 7,287,053 B2 | 10/2007 | Bodin |
| 7,305,671 B2 | 12/2007 | Davidov et al. |
| 7,328,367 B2 | 2/2008 | Ukai et al. |
| 7,330,997 B1 | 2/2008 | Odom |
| 7,337,311 B2 | 2/2008 | Chen et al. |
| 7,392,046 B2 | 6/2008 | Leib et al. |
| 7,401,125 B1 | 7/2008 | Uchida et al. |
| 7,480,822 B1 | 1/2009 | Arbon et al. |
| 7,487,383 B2 | 2/2009 | Bensinger |
| 7,512,584 B2 | 3/2009 | Keith, Jr. |
| 7,571,467 B1 | 8/2009 | Priestley et al. |
| 7,577,431 B2 | 8/2009 | Jiang |
| 7,624,086 B2 | 11/2009 | Keith, Jr. |
| 7,627,694 B2 | 12/2009 | Sreenivasan et al. |
| 7,664,834 B2 | 2/2010 | Keith, Jr. |
| 7,698,487 B2 | 4/2010 | Rothman et al. |
| 7,703,142 B1 | 4/2010 | Wilson et al. |
| 7,752,486 B2 | 7/2010 | Satran et al. |
| 7,788,524 B2 | 8/2010 | Wing et al. |
| 7,840,514 B2 | 11/2010 | Keith, Jr. |
| 7,844,686 B1 | 11/2010 | Keith, Jr. |
| 7,886,031 B1 | 2/2011 | Taylor et al. |
| 7,908,339 B2 | 3/2011 | Keith, Jr. |
| 7,912,902 B2 | 3/2011 | Cheng et al. |
| 8,099,378 B2 | 1/2012 | Keith, Jr. |
| 8,126,722 B2 | 2/2012 | Robb et al. |
| 8,175,418 B1 | 5/2012 | Keith, Jr. |
| 8,234,238 B2 | 7/2012 | Keith, Jr. |
| 8,244,864 B1 | 8/2012 | Bahl et al. |
| 8,307,239 B1 | 11/2012 | Keith, Jr. |
| 8,423,821 B1 | 4/2013 | Keith, Jr. |
| 8,612,741 B2 | 12/2013 | Crisan et al. |
| 2001/0034736 A1 | 10/2001 | Eylon et al. |
| 2001/0037323 A1 | 11/2001 | Moulton et al. |
| 2001/0037399 A1 | 11/2001 | Eylon et al. |
| 2001/0037400 A1 | 11/2001 | Raz et al. |
| 2001/0044850 A1 | 11/2001 | Raz et al. |
| 2001/0049793 A1 | 12/2001 | Sugimoto |
| 2002/0007418 A1 | 1/2002 | Hegde et al. |
| 2002/0013827 A1 | 1/2002 | Edstrom et al. |
| 2002/0035674 A1 | 3/2002 | Vetrivelkumaran et al. |
| 2002/0042833 A1 | 4/2002 | Hendler et al. |
| 2002/0049764 A1 | 4/2002 | Boothby et al. |
| 2002/0059505 A1 | 5/2002 | St. Pierre et al. |
| 2002/0083183 A1 | 6/2002 | Pujare et al. |
| 2002/0087625 A1 | 7/2002 | Toll et al. |
| 2002/0087717 A1 | 7/2002 | Artzi et al. |
| 2002/0087883 A1 | 7/2002 | Wohlgemuth et al. |
| 2002/0087963 A1 | 7/2002 | Eylon et al. |
| 2002/0091763 A1 | 7/2002 | Shah et al. |
| 2002/0094868 A1 | 7/2002 | Tuck et al. |
| 2002/0099934 A1 | 7/2002 | Cromer et al. |
| 2002/0104080 A1 | 8/2002 | Woodard et al. |
| 2002/0107920 A1 | 8/2002 | Hotti |
| 2002/0107945 A1 | 8/2002 | George et al. |
| 2002/0116585 A1 | 8/2002 | Scherr |
| 2002/0124092 A1 | 9/2002 | Urien |
| 2002/0129089 A1 | 9/2002 | Hegde et al. |
| 2002/0131404 A1 | 9/2002 | Mehta et al. |
| 2002/0138640 A1 | 9/2002 | Raz et al. |
| 2002/0157089 A1 | 10/2002 | Patel et al. |
| 2002/0161868 A1 | 10/2002 | Paul et al. |
| 2002/0161908 A1 | 10/2002 | Benitez et al. |
| 2002/0169797 A1 | 11/2002 | Hegde et al. |
| 2002/0188941 A1 | 12/2002 | Cicciarelli et al. |

(56) References Cited

U.S. PATENT DOCUMENTS

| | | |
|---|---|---|
| 2003/0004882 A1 | 1/2003 | Holler et al. |
| 2003/0005096 A1 | 1/2003 | Paul et al. |
| 2003/0009538 A1 | 1/2003 | Shah et al. |
| 2003/0014470 A1 | 1/2003 | Iijima |
| 2003/0031164 A1 | 2/2003 | Nabkel et al. |
| 2003/0033379 A1 | 2/2003 | Civanlar et al. |
| 2003/0036882 A1 | 2/2003 | Harper et al. |
| 2003/0037328 A1 | 2/2003 | Cicciarelli et al. |
| 2003/0041136 A1 | 2/2003 | Cheline et al. |
| 2003/0046371 A1 | 3/2003 | Falkner |
| 2003/0051128 A1 | 3/2003 | Rodriguez et al. |
| 2003/0055878 A1* | 3/2003 | Fletcher .................. G06F 9/465 709/203 |
| 2003/0061067 A1 | 3/2003 | Atwal et al. |
| 2003/0078960 A1 | 4/2003 | Murren et al. |
| 2003/0110188 A1 | 6/2003 | Howard et al. |
| 2003/0120502 A1 | 6/2003 | Robb et al. |
| 2003/0126242 A1 | 7/2003 | Chang |
| 2003/0140160 A1 | 7/2003 | Raz et al. |
| 2003/0177381 A1 | 9/2003 | Ofek et al. |
| 2003/0191730 A1 | 10/2003 | Adkins et al. |
| 2003/0204562 A1 | 10/2003 | Hwang |
| 2003/0233383 A1 | 12/2003 | Kosimies |
| 2003/0233493 A1 | 12/2003 | Boldon et al. |
| 2004/0010716 A1 | 1/2004 | Childress et al. |
| 2004/0025018 A1 | 2/2004 | Haas et al. |
| 2004/0068554 A1 | 4/2004 | Bales et al. |
| 2004/0073787 A1 | 4/2004 | Ban et al. |
| 2004/0093492 A1 | 5/2004 | Daude et al. |
| 2004/0098426 A1 | 5/2004 | Ishii et al. |
| 2004/0104927 A1 | 6/2004 | Husain et al. |
| 2004/0107273 A1 | 6/2004 | Biran et al. |
| 2004/0123153 A1 | 6/2004 | Wright et al. |
| 2004/0128346 A1 | 7/2004 | Melamed et al. |
| 2004/0148306 A1 | 7/2004 | Moulton et al. |
| 2004/0180721 A1 | 9/2004 | Rowe |
| 2004/0193876 A1 | 9/2004 | Donley et al. |
| 2004/0201604 A1 | 10/2004 | Kraenzel et al. |
| 2004/0236843 A1 | 11/2004 | Wing et al. |
| 2004/0243650 A1 | 12/2004 | McCrory et al. |
| 2004/0243928 A1 | 12/2004 | Hesmer et al. |
| 2004/0267944 A1 | 12/2004 | Britt, Jr. |
| 2005/0027846 A1 | 2/2005 | Wolfe et al. |
| 2005/0033757 A1 | 2/2005 | Greenblatt et al. |
| 2005/0033808 A1 | 2/2005 | Cheng et al. |
| 2005/0044197 A1 | 2/2005 | Lai |
| 2005/0044332 A1 | 2/2005 | de Brebisson |
| 2005/0044544 A1 | 2/2005 | Slivka et al. |
| 2005/0060281 A1 | 3/2005 | Bucher et al. |
| 2005/0071267 A1 | 3/2005 | Takahashi et al. |
| 2005/0096920 A1 | 5/2005 | Matz et al. |
| 2005/0108297 A1 | 5/2005 | Rollin et al. |
| 2005/0108546 A1 | 5/2005 | Lehew et al. |
| 2005/0108593 A1 | 5/2005 | Purushothaman et al. |
| 2005/0144218 A1 | 6/2005 | Heintz |
| 2005/0149729 A1 | 7/2005 | Zimmer et al. |
| 2005/0160289 A1 | 7/2005 | Shay |
| 2005/0188315 A1 | 8/2005 | Campbell et al. |
| 2005/0192035 A1 | 9/2005 | Jiang |
| 2005/0193245 A1 | 9/2005 | Hayden et al. |
| 2005/0198196 A1 | 9/2005 | Bohn et al. |
| 2005/0198239 A1 | 9/2005 | Hughes |
| 2005/0216524 A1 | 9/2005 | Gomes et al. |
| 2005/0216902 A1 | 9/2005 | Schaefer |
| 2005/0226059 A1 | 10/2005 | Kavuri et al. |
| 2005/0256952 A1 | 11/2005 | Mouhanna et al. |
| 2005/0262503 A1 | 11/2005 | Kane |
| 2005/0268145 A1 | 12/2005 | Hufferd et al. |
| 2005/0273486 A1 | 12/2005 | Keith, Jr. |
| 2005/0283606 A1 | 12/2005 | Williams |
| 2005/0286435 A1 | 12/2005 | Ogawa et al. |
| 2006/0021040 A1 | 1/2006 | Boulanger et al. |
| 2006/0031377 A1 | 2/2006 | Ng et al. |
| 2006/0031407 A1 | 2/2006 | Dispensa et al. |
| 2006/0031529 A1 | 2/2006 | Keith, Jr. |
| 2006/0035713 A1 | 2/2006 | Cockerille et al. |
| 2006/0041641 A1 | 2/2006 | Breiter et al. |
| 2006/0041759 A1 | 2/2006 | Kaliski, Jr. et al. |
| 2006/0047716 A1 | 3/2006 | Keith, Jr. |
| 2006/0047946 A1 | 3/2006 | Keith, Jr. |
| 2006/0059384 A1 | 3/2006 | Helliker |
| 2006/0074943 A1 | 4/2006 | Nakano et al. |
| 2006/0095705 A1 | 5/2006 | Wichelman et al. |
| 2006/0106842 A1 | 5/2006 | Diament et al. |
| 2006/0106896 A1 | 5/2006 | Carlson et al. |
| 2006/0129459 A1 | 6/2006 | Mendelsohn |
| 2006/0143709 A1 | 6/2006 | Brooks et al. |
| 2006/0149955 A1 | 7/2006 | Velhal et al. |
| 2006/0179061 A1 | 8/2006 | D'Souza et al. |
| 2006/0224544 A1 | 10/2006 | Keith, Jr. |
| 2006/0224545 A1 | 10/2006 | Keith, Jr. |
| 2006/0233310 A1 | 10/2006 | Adams et al. |
| 2007/0011292 A1 | 1/2007 | Fristch et al. |
| 2007/0078982 A1 | 4/2007 | Aidun et al. |
| 2007/0094269 A1 | 4/2007 | Mikesell et al. |
| 2007/0143374 A1 | 6/2007 | D'Souza et al. |
| 2007/0174658 A1 | 7/2007 | Takamoto et al. |
| 2007/0174690 A1 | 7/2007 | Kambara et al. |
| 2007/0185936 A1 | 8/2007 | Derk et al. |
| 2007/0233633 A1 | 10/2007 | Keith, Jr. |
| 2007/0239905 A1 | 10/2007 | Banerjee et al. |
| 2007/0255604 A1 | 11/2007 | Seelig |
| 2007/0271290 A1 | 11/2007 | Keith, Jr. |
| 2007/0271428 A1 | 11/2007 | Atluri |
| 2007/0274315 A1 | 11/2007 | Keith, Jr. |
| 2007/0276836 A1 | 11/2007 | Chatterjee et al. |
| 2008/0016387 A1 | 1/2008 | Bensinger |
| 2008/0034019 A1 | 2/2008 | Cisler et al. |
| 2008/0034071 A1 | 2/2008 | Wilkinson et al. |
| 2008/0072002 A1 | 3/2008 | Kuwahara et al. |
| 2008/0077622 A1 | 3/2008 | Keith, Jr. |
| 2008/0077630 A1 | 3/2008 | Keith, Jr. |
| 2008/0090560 A1 | 4/2008 | Bouzid et al. |
| 2008/0127294 A1 | 5/2008 | Keith, Jr. |
| 2008/0209142 A1 | 8/2008 | Obernuefemann |
| 2008/0216168 A1 | 9/2008 | Larson et al. |
| 2008/0294860 A1 | 11/2008 | Stakutis et al. |
| 2008/0313632 A1* | 12/2008 | Kumar ................ G06F 9/44505 718/100 |
| 2009/0075593 A1 | 3/2009 | Demirbasa et al. |
| 2009/0094362 A1 | 4/2009 | Huff |
| 2010/0050011 A1 | 2/2010 | Takamoto et al. |
| 2010/0125770 A1 | 5/2010 | Keith, Jr. |
| 2011/0047118 A1 | 2/2011 | Keith, Jr. |
| 2011/0161729 A1 | 6/2011 | Ritz et al. |
| 2012/0084364 A1 | 4/2012 | Sivavakeesar |
| 2012/0198154 A1 | 8/2012 | Keith, Jr. |
| 2012/0272099 A1 | 10/2012 | Keith, Jr. |
| 2013/0031405 A1 | 1/2013 | Keith, Jr. |

FOREIGN PATENT DOCUMENTS

| | | |
|---|---|---|
| WO | WO2005119495 A2 | 12/2005 |
| WO | WO2006010131 A2 | 1/2006 |
| WO | WO2006094282 A2 | 9/2006 |
| WO | WO2006094301 A2 | 9/2006 |
| WO | WO2007139962 A2 | 12/2007 |
| WO | WO2007139963 A2 | 12/2007 |
| WO | WO2008039386 A2 | 4/2008 |
| WO | WO2008039394 A2 | 4/2008 |
| WO | WO2008039395 A2 | 4/2008 |

OTHER PUBLICATIONS http://www.swapdrive.com/sdbackup.asp.
http://www.backup.com.
VMware,Using VMware Infrastructure for Backup and Restore, Oct. 26, 2006, http;/www.vmware.com/resource/techresources/, pp. 1-20.
VMware,VMware Infrastructure Architecture Overview, Jun. 14, 2006, http;/www.vmware.com/resource/techresources/, pp. 1-14.
IEEE100 The Authoritative Dictionary of IEEE Standards Terms, Seventh Edition, Jan. 2003. 3 pages.

(56) References Cited

OTHER PUBLICATIONS

Microsoft@ Computer Dictionary, Fifth Edition, 2002, 3 pages.
MacDonald, J.P., "File System Support for Delta Compression," University of California at Berkeley, Dept. of Electrical Engineering and Computer Sciences, May 19, 2000, 32 pages.
Tridgell, A., "Efficient Algorithms for Sorting and Synchronization," Thesis, The Australian National University, Feb. 1999, 106 pages.
Random House Unabridged Dictionary, "device: meaning and definitions," 1997, RandomHouse Inc., retrieved via "http://dictionary.infoplease.com/device."
http://en.wikipedia.org/wik/Expert system, pp. 1-9.
http://.pctools.com/registry-mechanic/.pp. 1-2.
http:/www.stealthbits.com/,pp. 1-2.
http://macrovision.com/products/flexnet_intallshield/installshield/index.shtml, pp. 1-2.
http://macrovision.com/products/flexnet_intallshield/installshield/overview/index.shtml, pp. 1-3.
http://www.microsoft.com/technet/prodtechnol/windows2000serv/maintain/featsability/inmnwp.mspx, pp. 1-36.
Muthitacharoen et al., "A Low-bandwidth Network File System," MIT Laboratory for Computer Science and NYU Department of Computer Science, 2001, 14 pages.
Shepler et al. "RFC 3530—Network File System (NFS) version 4 Protocol"/ Standards Track, Apr. 2003, pp. 278, http://tools.ietf.org/html/rfc3530#page-119.
Cisco PIX"Configuring an IPSec Tunnel Between a Cisco Secure PIX Firewall and a Checkpoint NG Firewall." May 12, 2006, document ID 23785.
Yu et al.,"Scalable network resource managemant for large scale Virtual Private Networks," Stimulation Modeling Practice and Theory, 12(2004) pp. 263-285.
Bandwidth Capping at Source http;//www..24onlinebilling.comdownload/whitepapers/Bandwidth%20Capping%20At%20Source.pdf pp. 1-9.
Microsoft Press, Microsoft® Computer Dictionary, Fifth Edition, May 1, 2002, p. 39.
Definition of Plug-in (computing) from http://en.wikipedia.org/wiki/Plug-in_(computing), printed on Jun. 8, 2011,1 page.
Plug-in definition from Wikipedia, http://en.wikipedia.org/wiki/Plug-in_(computing), printed Nov. 6, 2011, 5 pages.
Definition of background processing, IEEE 100, The Authorative Dictionary of IEEE Standards Terms, 7th Edition, 2000, 3 pages.

\* cited by examiner

ENVIRONMENT MANAGER

RELATED APPLICATION(S)

The present application is a continuation of co-pending U.S. patent application Ser. No. 11/977,890, filed Oct. 26, 2007, and entitled "ENVIRONMENT MANAGER," which is hereby incorporated by reference.

FIELD OF THE INVENTION

The present invention relates to the field of computing. More specifically, the present invention relates to the field of managing information technology environments.

BACKGROUND OF THE INVENTION

Information Technology (IT) management is a combination of IT and management which is the management of computer-based information systems. The reason why IT needs to be managed stems from the continuous growth in IT systems. Initially, when networking began, typically individual computers were coupled to a computer which was serving data. This computer serving data was usually set up and controlled by a single person. Therefore, considering the entire system included one person and one computer, little management was needed.

However, with the incredible growth of the Internet, companies, in addition to academia, the government and individuals, began utilizing the Internet for more complex tasks. Again, at first, it was possible for a company to set up a static website which required little computing power and resources. With the advent of e-commerce and other advances in the Internet, companies moved on to interactive websites which allow users to send, store and manipulate data on a company's website. Additionally, the uptime requirements for websites increased considering downtime equaled lost revenue. For instance, a major website being down for a few minutes could result in millions of dollars in lost revenues, not to mention user dissatisfaction. Moreover, in some instances, data needs to be very secure, such as customers' credit card information or employment information.

Therefore, to confront all of these new requirements of content, stability and security, the complexity of IT management has grown significantly. Unlike the early days of networking when computing systems were small, possibly even one computer, present IT systems comprise many hardware and software components which are very interconnected. A typical IT system today is likely to include many servers, many backup devices, one or more firewalls for security, other networking components such as routers and hubs and a huge amount of software applications which are used in many tasks ranging from accessing, storing, manipulating and securing data. To manage the complex IT systems of today and in the future, IT management has to continuously evolve and adapt, so that these systems remain manageable.

SUMMARY OF THE INVENTION

An environment manager includes a set of consolidated and integrated utilities which allow an administrator direct, remote access to information technology resources. The environment manager allows the administrator to control many aspects of the information technology environment including backup and archival of data systems, monitoring of systems, opening and closing of information technology systems, server fail-overs and virtual server environments, managing expert application, desktop management and security and system security.

In one aspect, a system for managing an information technology setup comprises a set of management applications for managing a first computing device, a set of custom portlets coupled to the set of management applications for transferring data to and from the management applications and a portal user interface coupled to the set of custom portlets for communicating with the set of management applications through the custom portlets. The set of management applications are stored on the first computing device. The set of custom portlets are stored on the first computing device. Alternatively, the set of custom portlets are stored on a second computing device. The portal user interface is stored on a second computing device. The second computing device is remote from the first computing device. The portlets enable cross-platform communication. The first computing device is selected from the group consisting of a personal computer, a server, a laptop, a cellular phone, a gaming system, a PDA and a networking device. Managing the first computing device includes at least one of backing up and archiving data, monitoring environmental conditions, handling server fail-over and virtual server environments, desktop management, desktop security, applications management and security.

In another aspect, a system for managing an information technology setup comprises a computing device containing a portal user interface and a set of additional computing devices coupled to the computing device, wherein each of the additional computing devices contain a set of management applications for managing each of the additional computing devices. The computing device further contains a set of portlets. Alternatively, each of the additional computing devices contain a set of portlets. The computing device is remote from the set of additional computing devices. The portlets enable cross-platform communication. The additional computing devices are selected from the group consisting of a personal computer, a server, a laptop, a cellular phone, a gaming system, a PDA and a networking device. Managing each of the additional computing devices includes at least one of backing up and archiving data, monitoring environmental conditions, handling server fail-over and virtual server environments, desktop management, desktop security, applications management and security.

In another aspect, an apparatus for managing an information technology setup comprises a processing component and a portal interface for utilizing the processing component to communicate with a set of additional computing devices. The apparatus further comprises a set of portlets for providing a mechanism for the portal interface to communicate with the additional computing devices. The portal user interface utilizes the set of portlets to communicate with a set of management applications stored on each of the additional computing devices. The set of portlets are contained on the computing device. Alternatively, the set of portlets are contained on each of the additional computing devices. The computing device is remote from the set of additional computing devices. The portlets enable cross-platform communication. The additional computing devices are selected from the group consisting of a personal computer, a server, a laptop, a cellular phone, a gaming system, a PDA and a networking device. Communicating with the set of additional computing devices includes at least one of backing up and archiving data, monitoring environmental conditions, handling server fail-over and virtual server environments, desktop management, desktop security, applications management and security.

In yet another aspect, a method of for managing an information technology setup comprises generating a set of custom portlets, utilizing a portal user interface to communicate with a set of management applications through the custom portlets and utilizing the management applications to manage a set of additional computing devices. The portal user interface is contained on a computing device. The computing device is remote from the set of additional computing devices. The portlets enable cross-platform communication. The additional computing devices are selected from the group consisting of a personal computer, a server, a laptop, a cellular phone, a gaming system, a PDA and a networking device. Utilizing the management applications to manage the set of additional computing devices includes at least one of backing up and archiving data, monitoring environmental conditions, handling server fail-over and virtual server environments, desktop management, desktop security, applications management and security. Utilizing the management applications to manage the set of additional computing devices includes automatically executing a process when a condition is met.

DETAILED DESCRIPTION OF THE PREFERRED EMBODIMENT

An environment manager is a consolidated interface and an integrated platform which allows an Information Technology (IT) administrator direct remote access to IT resources. The environment manager allows the IT administrator to control many aspects of the IT environment including, but not limited to, back up and archival of data systems, monitoring of all systems such as environment conditions, opening/closing and monitoring of IT systems, server fail-overs and virtual server environments, a managing expert application, desktop management, desktop security, and back up and applications management, and system security. The managing expert application allows an IT administrator or consulting company to manage and consolidate multiple sites from a single console.

The environment manager uses portal technology, where a user is able to define the look and feel of his/her own interface. Portal technology allows a single point of access to information which is linked from various logically related applications. Furthermore, although the information is presented in a unified manner, the information is able to be from diverse sources. Each system application that is able to be controlled by the portal exposes an interface to the portal. The interface is then defined as a portlet, wherein portlets are pluggable user interface components that are managed and displayed in a portal. Using this implementation, a single individual is able to monitor an IT environment through the portal very easily.

Figure 1:
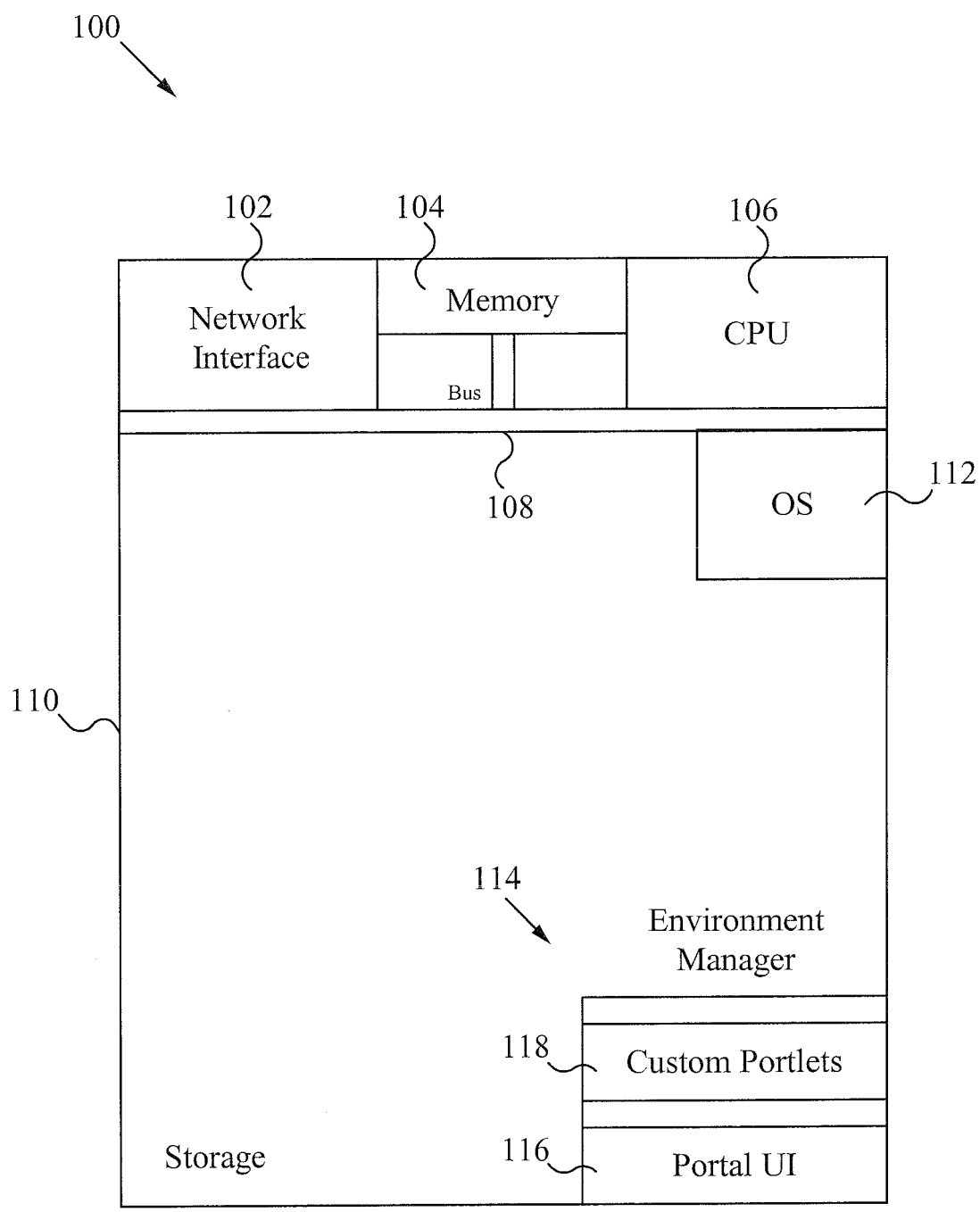
FIG. 1 illustrates a block diagram of an environment manager computing device implementing an environment manager.

FIG. 1 illustrates a block diagram of an environment manager computing device 100 implementing an environment manager 114. The environment manager computing device 100 contains standard computing components including a network interface 102, a memory 104, a central processing unit 106, a system bus 108 and storage 110 in addition to other standard computing components. Furthermore, the environment manager computing device 100 is able to have multiple of each of these components, for example many computing devices such as servers have more than one central processing unit 106. The storage 110 is able to be any storage implementation such as a hard disk drive, RAID, or another form of storage. Contained within the storage area are several components of the environment manager 114. The environment manager 114 comprises a portal user interface 116, custom portlets 118 and management applications 120 (FIG. 2). The portal user interface 116 enables easy user interaction with the environment manager 114. The custom portlets 118 are configured and defined to provide the desired look and feel for applications such as the management applications 120 which are stored on another computing device. Furthermore, the portlets 118 enable utilization of the management applications 120 on a variety of machines. The management applications 120 are able to manage many different aspects of an IT environment. The management applications 120 are also able to monitor environmental aspects such as capacity, temperature and system loads in a network in addition to other aspects of the network. In some embodiments, the custom portlets are stored on another computing device instead of the environment manager computing device 100. Specifically, in some embodiments, the custom portlets are stored on the same device(s) that contain(s) the management application(s).

Figure 2A:
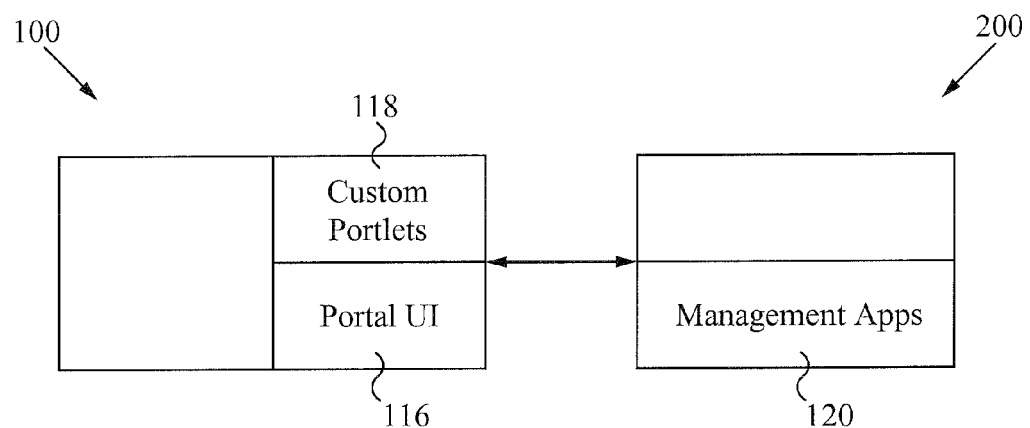
FIG. 2A illustrates a block diagram of an embodiment of an environment manager computing device coupled to a device containing management applications.

FIG. 2A illustrates a block diagram of an embodiment of an environment manager computing device 100 coupled to a device 200 containing management applications 120. In an embodiment, the portal user interface 116 and the custom portlets 118 are stored on the environment manager computing device 100. The environment computing device 100 communicates with the device 200 via the custom portlets 118. Specifically, the portal user interface 116 is able to send and receive data to/from the management applications 120 through the custom portlets 118.

Figure 2B:
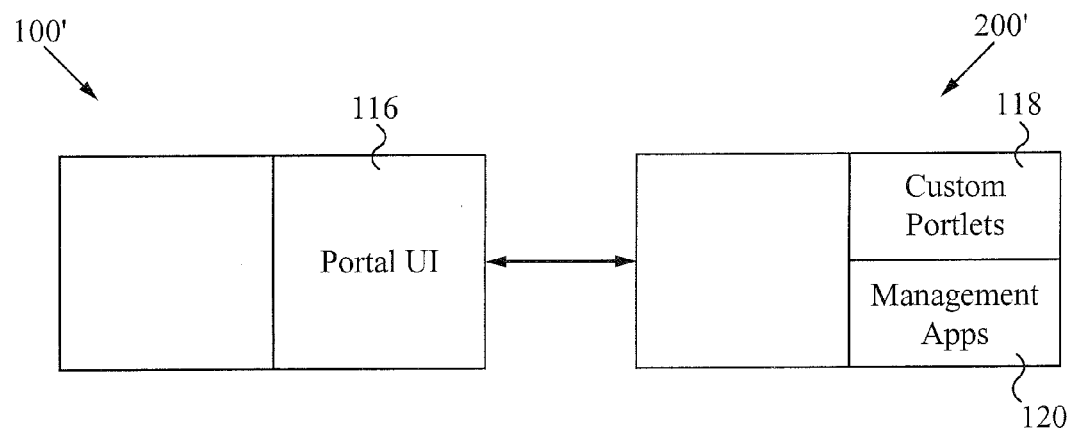
FIG. 2B illustrates a block diagram of an embodiment of an environment manager computing device coupled to a device containing management applications and custom portlets.

FIG. 2B illustrates a block diagram of an embodiment of an environment manager computing device 100' coupled to a device 200' containing management applications 120 and custom portlets 118. In this embodiment, the environment manager computing device 100' contains the portal user interface 116, and the device 200' contains the custom portlets 118 and the management applications 120. Although the configuration is slightly different from that shown in FIG. 2A, the portal user interface 116 is still able to send and receive data to/from the management applications 120 through the custom portlets 118.

Figure 3:
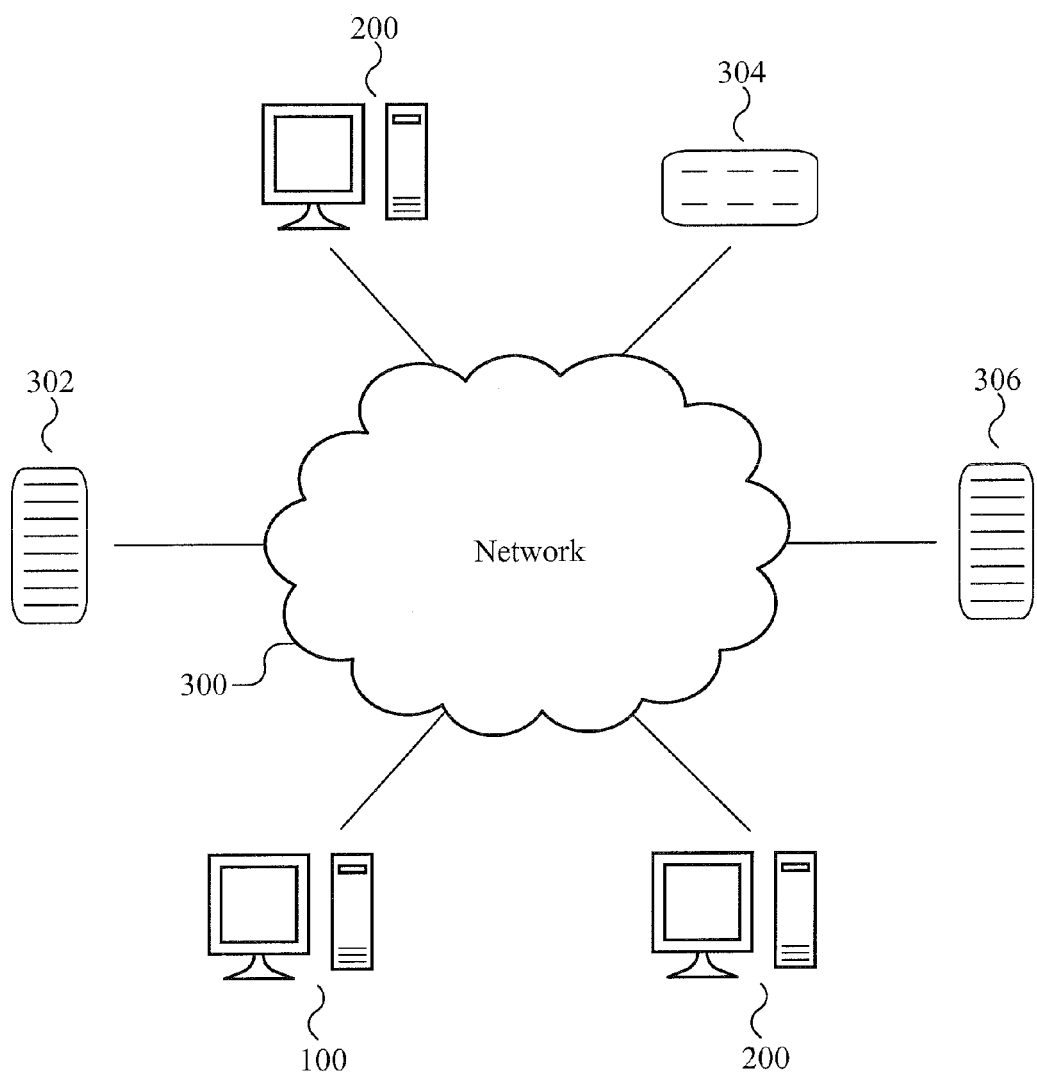
FIG. 3 illustrates a graphical representation of a network with an environment manager computing device.

FIG. 3 illustrates a graphical representation of a network with an environment manager computing device 100. The environment manager computing device 100 is coupled to a network 300 to which many devices are coupled. The network 300 is coupled to servers 302 and 306, personal computers 200 and a device such as a firewall 304. Other computing devices such as laptops, cellular phones, gaming systems, PDAs and networking equipment are also able to couple to the network 300. Furthermore, other networks are able to couple to the network 300. Moreover, within each device that is coupled to the network 300, there are many different types of software applications that are able to run. These applications are able to be executed, configured, upgraded and manipulated in other ways. Utilizing the environment manager computing device 100, an administrator is able to directly access the networked devices remotely. By accessing the networked devices remotely, the administrator is able to backup and archive data systems, monitor the networked devices, handle/configure server fail-overs and virtual server environments, implement a managing expert application, provide desktop management, desktop security and application management, provide system security and perform many other tasks.

Figure 4:
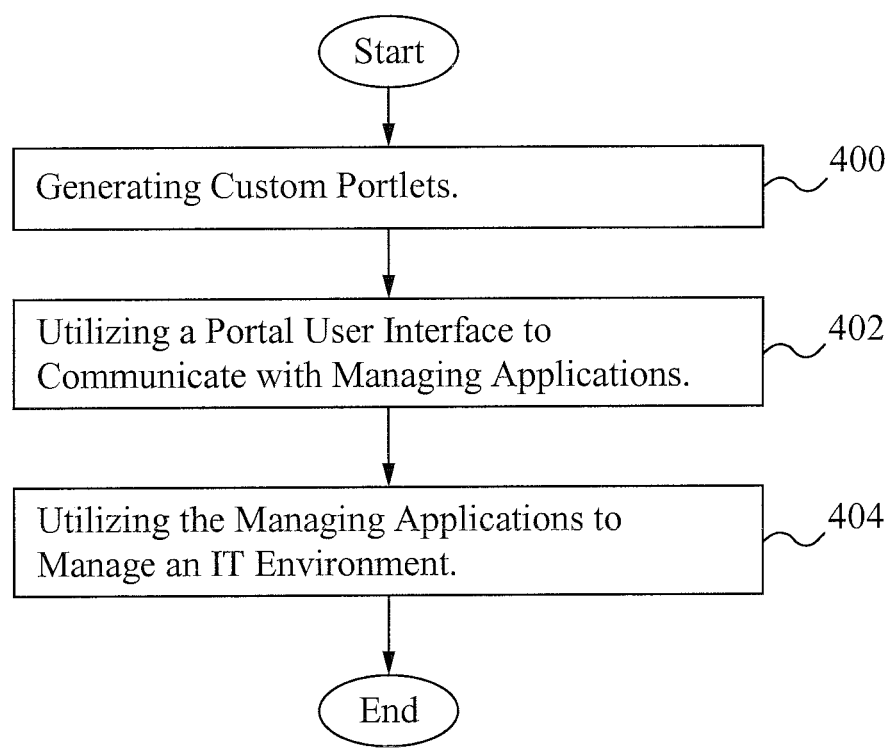
FIG. 4 illustrates a flowchart of a process of utilizing an environment manager to manage multiple IT environments.

FIG. 4 illustrates a flowchart of a process of utilizing an environment manager to manage multiple IT environments. In the step 400, custom portlets are generated for each application in the network that is to be controlled using the portal interface within the environment manager. The custom portlets allow the portal to communicate with the applications on each device in the network. When additional components are added to the network, custom portlets are able to be generated and added for those additional components. For example, if a new backup device is installed, a custom portlet is able to be generated, so that the backup device is also able to be managed using the environment manager. In some embodiments, the custom portlets are previously generated, thus the step 400 is able to be skipped. In the step 402, a portal user interface is used to communicate with management applications via the custom portlets. In the step 404, the management applications send and retrieve data to and from the devices within the network to manage the IT environment. In some embodiments, the management applications are pre-existing on a device to be managed, while in other embodiments, the management applications are developed for the device. In some embodiments, the management applications are able to automatically execute a process when a condition is met.

For example, in an exemplary configuration a network includes two servers, a backup device, a firewall, fifty workstations and a variety of software applications on each device. Applications are developed which will communicate and manage the many components within the network. For example, an application is developed for the backup device that monitors the backup device's capabilities such as capacity, and that the backup device is functioning properly. Furthermore, applications are developed so that specific backup modifications are able to take place, such as how the data is saved on the backup device. Any feature that is able to be controlled locally is able to be performed via the environment manager. Additional applications and portlets are developed on the other devices, such as the servers, the firewall and the fifty workstations, so that they are all able to be monitored and managed from a remote location.

In addition to being able to manage devices and applications from a remote location, other qualities of a network are able to be monitored such as events and performance. For example, management applications are able to be configured to monitor a system for an event such as a drive failure. It is possible that a drive could fail in a remote location, but if it is being monitored using the environment manager, an administrator is able to take immediate action. Furthermore, the management applications are able to be configured to monitor a system's performance such as a CPU utilization approaching 100% could indicate a server attack or other issue, and an administrator monitoring this is able to take action to prevent the attack.

The environment manager with the portal is able to couple to many different aspects of a network to provide full environmental coverage. For example, the event manager with the portal is able to couple to $3^{rd}$ party products, WAN services, desktop management, standby server consoles, storage consoles, backup consoles, security consoles, expert manager consoles and event/performance managers. By monitoring and communicating with each of these components, the portal enables a single user such as an administrator to easily and efficiently monitor an IT environment.

To utilize the environment manager, management applications are developed as well as portlets which allow communication between the management applications and a portal. The management applications are installed on computing devices that are to be monitored and managed. The portal is then used to monitor and manage events, performance and other environmental conditions on the computing devices. As situations arise, such as the need to modify a computing device's configuration, transfer data from one location to another or any other task, an administrator is able to perform such tasks remotely using the environment manager. Furthermore, multiple sites or networks are able to be managed through the environment manager. The portal is used to manage an environment either by text commands or preferably via a Graphical User Interface (GUI).

In operation, the environment manager continuously monitors a networked environment. When an event arises, an administrator is alerted, so that a desired action is able to be taken. In some embodiments, automatic action is taken based on conditions or scripts that are pre-determined and pre-developed. For example, a script is able to be written so that once a monitored hard drive reaches 90% capacity, the script will automatically start transferring some of the data to another storage location that is not almost full. In addition to monitoring events, the administrator is able to utilize the environment manager to modify the environment as desired. For example, if a new server is added to a network, the administrator is able to configure the network, so that the old server and new server share the serving duties appropriately. Aside from someone having to physically install the new server in an appropriate location, the management of the new server and the old server is able to occur from afar via the environment manager. Thus, if the new server and the old server are located in different locations, such as one in New Jersey and the other in California, instead of having to fly across the country for management, the environment manager is able to perform any configuration required from one location. Furthermore, the environment manager is able to accommodate cross-platform configurations such as if the first server is a Sun Microsystems® server running Solaris® while the second server is running Microsoft® Windows®. The environment manager is able to manage a variety of platforms because the environment manager utilizes specific applications to monitor and manage each computing device, and then utilizes portlets to communicate the data received from the specific applications to a portal in a system-agnostic manner which then presents the data to an administrator.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A computing device, comprising:
   one or more processors; and
   one or more hardware storage devices having stored thereon computer-executable instructions that are executable by the one or more processors to cause to the computing device to perform at least the following:
      receive, from a remote system, one or more modification commands through a set of custom portlets associated with a set of management applications that are stored locally at the computing device and that are configured for managing the computing device, wherein the set of custom portlets are configured to enable transfer of the one or more modification commands to the set of management applications and to enable the set of management applications to control the computing device based on the one or more modification commands; and
      locally automatically reconfigure the computing device when one or more predetermined conditions of the computing device are met, such that the set of management applications are able to continue to manage the computing device in accordance with the received one or more modification instructions when the computing device is unable to connect to the remote system.

2. The computing device as claimed in claim 1 wherein the set of custom portlets are stored on the computing device.

3. The computing device as claimed in claim 1 wherein the set of custom portlets are stored on another computing device.

4. The computing device as claimed in claim 1 wherein the portlets are associated with a portal user interface stored on another computing device.

5. The computing device as claimed in claim 4 wherein the other computing device is remote from the computing device.

6. The computing device as claimed in claim 1 wherein the custom portlets enable cross-platform communication.

7. The computing device as claimed in claim 1 wherein the computing device is selected from the group consisting of a personal computer, a server, a laptop, a cellular phone, a gaming system, a PDA and a networking device.

8. The computing device as claimed in claim 1 wherein reconfiguring the computing device includes at least one of backing up and archiving data, monitoring environmental conditions, handling server fail-over and virtual server environments, desktop management, desktop security, applications management and security.

9. A computer system configured for monitoring and controlling a computer environment, the computer system comprising:
   a first computer device, comprising:
      one or more processors; and
      one or more hardware storage devices having stored thereon computer-executable instructions which are executable by the one or more processors to operate a portal user interface, the portal user interface being operable to communicate modification commands to one or more separate computing devices; and
   a set of additional computing devices communicatively associated with the first computing device, wherein each of the additional computing devices comprises:
      one or more processors; and
      one or more hardware storage devices having stored thereon computer-executable instructions which are executable by the one or more processors to operate one or more management applications for managing and controlling the additional computing device, wherein the one or more management applications are configured to locally automatically reconfigure the additional computing device when one or more predetermined conditions of the additional computing device are met, such that the one or more management applications are able to reconfigure the additional computing device in accordance with any modification commands received from the first computer device through one or more portlets configured for transmitting the commands, the one or more management applications being enabled to execute the received modification commands when the additional computing device is unable to communicate with the first computing device.

10. The system as claimed in claim 9 wherein the first computing device further comprises a set of portlets.

11. The system as claimed in claim 10 wherein each of the additional computing devices comprise a set of portlets.

12. The system as claimed in claim 11 wherein the first computing device is remote from the set of additional computing devices.

13. The system as claimed in claim 10 wherein the portlets enable cross-platform communication.

14. The system as claimed in claim 10 wherein the additional computing devices are selected from the group consisting of a personal computer, a server, a laptop, a cellular phone, a gaming system, a PDA and a networking device.

15. The system as claimed in claim 10 wherein reconfiguring the additional computing device includes at least one of backing up and archiving data, monitoring environmental conditions, handling server fail-over and virtual server environments, desktop management, desktop security, applications management and security.

16. A computing device configured for monitoring and controlling a computer environment, the computing device comprising:
   one or more processors; and
   one or more hardware storage devices having stored thereon computer-executable instructions which are executable by the one or more processors to operate a portal interface configured to communicate with a set of additional computing devices using a set of portlets, the portal interface being configured to enable the computing device to utilize the set of portlets to send modification commands to one or more additional computing devices to control one or more management applications stored on the one or more additional computing devices, wherein the one or more management applications locally automatically reconfigure the one or more additional computing devices when one or more predetermined conditions of the one or more additional computing devices are met such that the one or more management applications are able to continue to control the one or more additional computing devices when the one or more additional computing devices are unable to connect to the computing device.

17. The apparatus as claimed in claim 16 wherein the set of portlets are contained on the computing device.

18. The apparatus as claimed in claim 16 wherein the set of portlets are contained on each of the additional computing devices.

19. The apparatus as claimed in claim 16 wherein the computing device is remote from the set of additional computing devices.

20. The apparatus as claimed in claim 16 wherein the portlets enable cross-platform communication.

21. The apparatus as claimed in claim 16 wherein the additional computing devices are selected from the group consisting of a personal computer, a server, a laptop, a cellular phone, a gaming system, a PDA and a networking device.

22. The apparatus as claimed in claim 16 wherein reconfiguring the one or more additional computing devices includes at least one of backing up and archiving data, monitoring environmental conditions, handling server failover and virtual server environments, desktop management, desktop security, applications management and security.

23. A computer-implemented method for monitoring and controlling a computer environment, the method being implemented by a computing system that includes at least one processor, the method comprising:
   generating a set of custom portlets, the set of custom portlets being configured to enable transfer of modification instructions to respective management applications of one or more remote computing devices; and
   sending one or more modification commands over a network using the custom portlets, the one or more modification commands instructing one or more management applications to reconfigure one or more remote computing devices, wherein the modification instructions cause the one or more management applications to locally automatically reconfigure the one or more remote computing devices when one or more predetermined conditions of the one or more remote computing devices are met such that the management applications are able to reconfigure the one or more remote computing devices when the one or more remote computing devices are unable to connect to the network.

24. The method as claimed in claim 23 wherein the custom portlets enable cross-platform communication.

25. The method as claimed in claim 23 wherein the one or more remote computing devices are selected from the group consisting of a personal computer, a server, a laptop, a cellular phone, a gaming system, a PDA and a networking device.

26. The method as claimed in claim 23 wherein reconfiguring the one or more remote computing devices includes at least one of backing up and archiving data, monitoring environmental conditions, handling server fail-over and virtual server environments, desktop management, desktop security, applications management and security.

27. A computer system configured as an environment manager for managing and reconfiguring a computer network, the computer system comprising:
   a first computer device, comprising:
      one or more processors; and
      one or more hardware storage devices having stored thereon computer-executable instructions which are executable by the one or more processors to operate a set of management applications for managing the first computing device, wherein the set of management applications are stored on the first computing device; and
   a second computing device, comprising:
      one or more processors; and
      one or more hardware storage devices having stored thereon computer-executable instructions which are executable by the one or more processors to operate a portal user interface, the portal user interface being configured to enable the second computing device to communicate with the first computing device over a network using a set of custom portlets respectively associated with the set of management applications, the portlets configured to enable transfer of modification commands to the management applications to enable the management applications to control the first computing device based on the commands such that the management applications locally automatically reconfigure the first computing device when one or more predetermined conditions of the first computing device are met such that the management applications are able to continue to control the first computing device when the first computing device is unable to communicate with the second computing device,
   wherein an additional custom portlet is generated by the environment manager for each application to be controlled on an additional computing device when the additional computing device is coupled to the network.

28. A computer system configured for controlling and reconfiguring an information technology setup comprising:
   a plurality of memory devices each comprising a set of management applications for managing a plurality of first computing devices, wherein the set of management applications are stored on the first computing devices;
   a plurality of sets of custom portlets each communicatively associated with one of the sets of management applications for controlling the management applications by transmitting one or more commands to the management applications wherein the management applications manage the plurality of first computing devices based on the one or more commands, wherein the management applications locally automatically manage the first computing devices when one or more predetermined conditions of the first computing devices are met such that the management applications are able to continue to control and reconfigure the first computing devices when the first computing devices are unable to connect to the remainder of the system; and
   a portal user interface coupled to each of the sets of custom portlets for communicating with the sets of management applications through the custom portlets,
   wherein each set of management applications correspond to an individual first computing device that the management applications control and further wherein an additional custom portlet is generated by the system when an additional computing device is coupled to a network.

* * * * *